US012036181B2

(12) United States Patent
Hover et al.

(10) Patent No.: US 12,036,181 B2
(45) Date of Patent: Jul. 16, 2024

(54) FLUID TRANSFER FITMENT, FLUID DISPENSING DEVICE, AND RELATED METHODS

(71) Applicants: Jeffery Bruce Hover, Altamont, NY (US); Hovina Inc., Altamont, NY (US)

(72) Inventors: Jeffery Bruce Hover, Altamont, NY (US); Sergio Medina Servin, Schenectady, NY (US)

(73) Assignees: Jeffery Bruce Hover, Altamont, NY (US); Hovina Inc., Albany, NY (US)

( * ) Notice: Subject to any disclaimer, the term of this patent is extended or adjusted under 35 U.S.C. 154(b) by 0 days.

(21) Appl. No.: 18/172,909

(22) Filed: Feb. 22, 2023

(65) Prior Publication Data

US 2023/0190581 A1 Jun. 22, 2023

Related U.S. Application Data

(63) Continuation of application No. PCT/US2022/072744, filed on Jun. 3, 2022.

(Continued)

(51) Int. Cl.

*A61J 1/20* (2006.01)
*B65D 35/10* (2006.01)

(Continued)

(52) U.S. Cl.

CPC ............ *A61J 1/2027* (2015.05); *B65D 35/10* (2013.01); *B65D 47/36* (2013.01); *B65D 75/5883* (2013.01)

(58) Field of Classification Search

CPC .... A61J 1/2027; B65B 61/186; B65D 1/0238; B65D 35/10; B65D 47/36; B65D 5/746;

(Continued)

(56) References Cited

U.S. PATENT DOCUMENTS

| | | | |
|---|---|---|---|
| 4,756,347 A | 7/1988 | Hagan et al. | |
| 6,142,341 A | 11/2000 | Uematsu | |

(Continued)

FOREIGN PATENT DOCUMENTS

| | | | | |
|---|---|---|---|---|
| ES | 2383106 T3 * | 6/2012 | ................ | A61J 1/05 |
| WO | 8907575 A1 | 8/1989 | | |
| WO | WO1989007575 * | 8/1989 | | |

OTHER PUBLICATIONS

PCT International Search Report and Written Opinion for International Application No. PCT/US22/72744, dated Sep. 12, 2022, 8 pages.

*Primary Examiner* — John K Fristoe, Jr.
*Assistant Examiner* — Madison L Poos
(74) *Attorney, Agent, or Firm* — Hoffman Warnick LLC

(57) ABSTRACT

Embodiments of the invention relate generally to fluid transfer fitments or devices, fluid dispensing devices including such fitments or devices, and methods for their construction and use. In one embodiment, the invention provides a fluid transfer fitment comprising: a tubular body having a sealed first end and a second end; a flanged member extending from the second end of the tubular body to form a flanged opening having a width greater than a width of the tubular body; a void formed between the flanged opening and the sealed first end; and a membrane within the void.

18 Claims, 5 Drawing Sheets

Related U.S. Application Data

(60) Provisional application No. 63/196,885, filed on Jun. 4, 2021.

(51) Int. Cl.
*B65D 47/36* (2006.01)
*B65D 75/58* (2006.01)

(58) Field of Classification Search
CPC ........... B65D 75/5811; B65D 75/5822; B65D 75/5861; B65D 75/5866; B65D 75/5872; B65D 75/5883; B65D 77/22
USPC .......................................................... 215/253
See application file for complete search history.

(56) References Cited

U.S. PATENT DOCUMENTS

| | | | | |
|---|---|---|---|---|
| 6,364,143 | B1 * | 4/2002 | Knierbein .......... | B65D 75/5883 215/261 |
| 7,762,414 | B2 | 7/2010 | Uytterhaeghe et al. | |
| 10,981,713 | B2 | 4/2021 | Genosar | |

* cited by examiner

FIG. 1
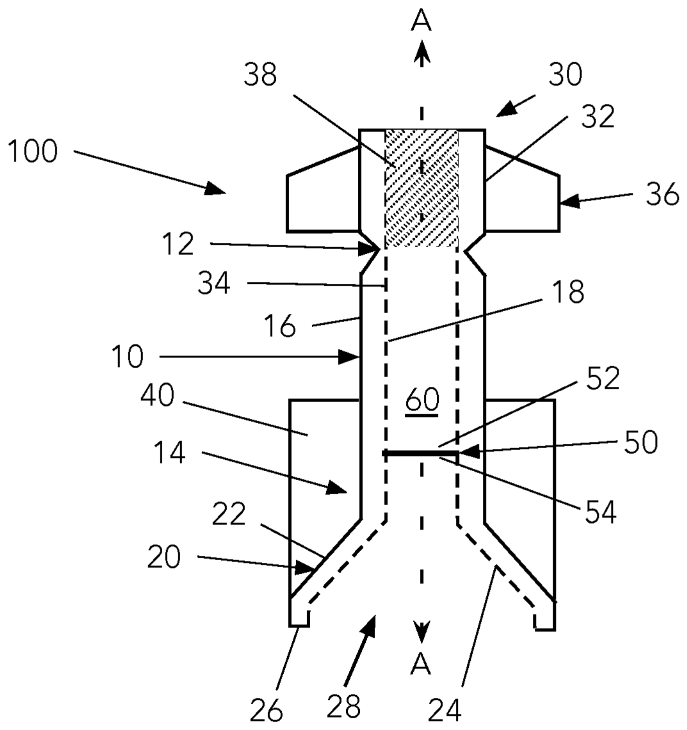
FIG. 2
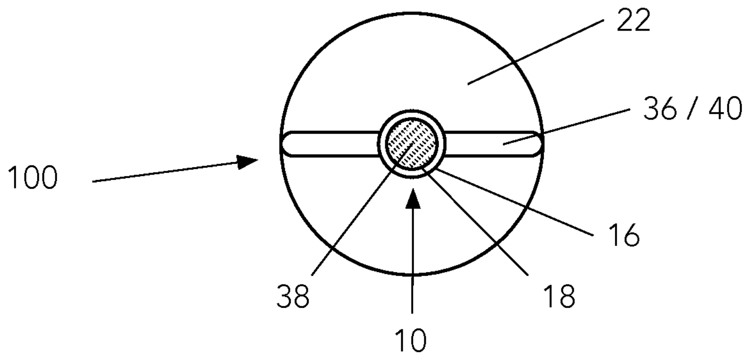
FIG. 3
FIG. 4
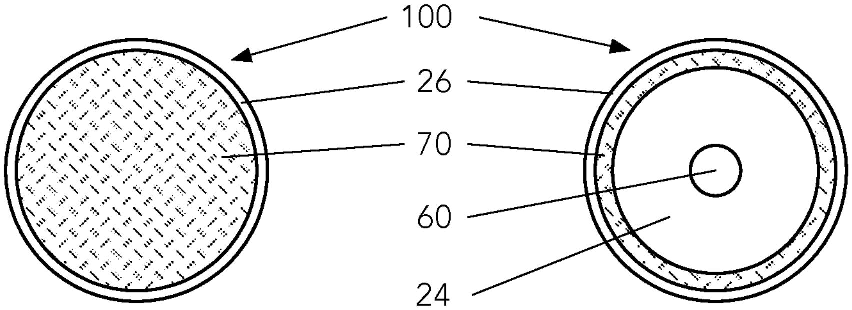

FLUID TRANSFER FITMENT, FLUID DISPENSING DEVICE, AND RELATED METHODS

CROSS-REFERENCE TO RELATED APPLICATIONS

This application claims priority to co-pending International Patent Application Serial No. PCT/US22/72744, filed 3 Jun. 2022, which claims priority to U.S. Provisional Patent Application Ser. No. 63/196,885, filed 4 Jun. 2021, each of which is hereby incorporated herein as though fully set forth.

BACKGROUND

Embodiments of the invention relate generally to fluid transfer fitments or devices, fluid dispensing devices including such fitments or devices, and methods for their construction and use. More particularly, embodiments of the invention relate to fluid transfer fitments or devices having removable seals.

SUMMARY

In one embodiment, the invention provides a fluid transfer fitment comprising: a tubular body having a sealed first end and a second end; a flanged member extending from the second end of the tubular body to form a flanged opening having a width greater than a width of the tubular body; a void formed between the flanged opening and the sealed first end; and a membrane within the void.

In another embodiment, the invention provides a method of constructing a fluid dispensing device, the method comprising: obtaining a fluid transfer fitment comprising: a tubular body having a sealed first end and a second end; a flanged member extending from the second end of the tubular body to form a flanged opening having a width greater than a width of the tubular body; inserting the flanged opening into a neck of a vessel; and sealing the neck of the vessel to at least one outer surface of the fluid transfer fitment.

In still another embodiment, the invention provides a fluid dispensing device constructed according to such a method.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 shows a cross-sectional side view of a fluid transfer fitment according to an embodiment of the invention;

FIG. 2 shows a top view of the fluid transfer fitment of FIG. 1;

FIG. 3 shows a bottom view of a fluid transfer fitment having a meltable seal;

FIG. 4 shows a bottom view of the fluid transfer fitment of FIG. 3 after the seal has been melted;

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION

Figure 5:
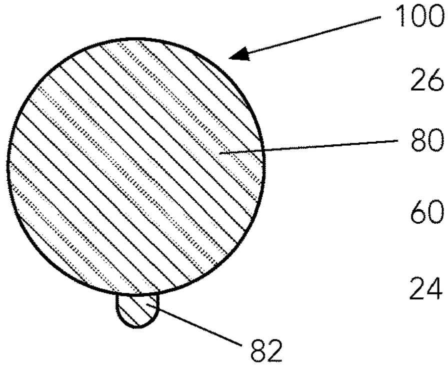
FIG. 5 shows a bottom view of a fluid transfer fitment having a peelable seal.

Fluid dispensing devices such as intravenous (IV) bags and bottles are known in the art. One method of constructing them is known as blow-fill-seal (BFS), in which a vessel having a flexible body is opened or inflated, typically using pressurized air (hence the term "blow"), a fluid is dispensed into the vessel body ("fill"), and the vessel body is sealed ("seal"). A subsequent process places a cap containing a fitment for fluid transfer is affixed to the sealed BFS container. The sealed vessel may include a fitment for transferring the fluid from inside the vessel body to its point of use. Such a fitment may be inserted into the vessel prior to sealing, in which case the process is referred to as blow-fill-insert-seal (BFIS).

One deficiency in such methods is that the entire process must take place under sterile conditions to avoid contamination of the fluid. This includes keeping the fitment stored under sterile conditions, since the fluid will ultimately pass through the fitment when transferred for use. Maintaining such sterile conditions is complex and expensive.

Applicant's invention includes a fluid transfer fitment having a removable seal used to maintain the sterility of the interior of the fitment. This removable seal may be removed when the fluid dispensing device is being constructed. This obviates the need to maintain the fitment under sterile conditions before the BFIS process is begun.

Turning now to the drawings, FIG. 1 shows a side cross-sectional view of a fluid transfer fitment 100 according to an embodiment of the invention. Fluid transfer fitment 100 comprises a tubular body 10 having a first end 12, a second end 14, an outer surface 16, and an inner surface 18. A flanged member 20 extends from the second end 14 of the tubular body 10, forming a flanged opening 28 having a width greater than a width of the tubular body 10.

A frangible portion of the fitment, shown here as a frangible cap 30, is either affixed to or formed into the first end 12 of the tubular body 10. This frangible cap 30 includes a plurality of wings 36 extending radially from its outer surface 32. The frangible cap 30 may be separated from the first end of the tubular body 10 by applying a rotational force about the longitudinal axis A of the tubular body 10. The frangible cap 30 may be solid or filled with a plug 38 fitted against an inner surface 34 of the frangible cap 30.

When the frangible cap 30 is in place, it protects the upper surface 52 of a membrane 50 extending across the inner surface 18 of the tubular member 10. The lower surface 54 of the membrane 50 faces a void 60 within the tubular body 10. To protect the lower surface 54, a removable seal covers the flanged opening 28, as will be described in greater detail below.

The flanged member 20, similar to the tubular body 10, includes an outer surface 22 and an inner surface 24. According to some embodiments of the invention, the flanged member 20 includes an edge 26 surrounding the flanged opening 28.

The fluid transfer fitment 100 may include one or more columnar member 40 extending radially outward from the outer surface 16 of the tubular body and axially to the outer surface 22 of the flanged member 20. As will be explained in greater detail below, the one or more columnar member 40 may aid in securing the fluid transfer fitment 100 within a vessel.

FIG. 2 shows a top view of the fluid transfer fitment 100. As shown in FIG. 2, wings 36 and columnar members 40 extend radially from the outer surface 16 of the tubular body 10, although this is neither necessary nor essential.

FIGS. 3 and 4 show bottom views of the fluid transfer fitment 100. In FIG. 3, a meltable seal 70 covers the flanged opening 28 (FIG. 1). The meltable seal 70 may be formed from the same material as other portions of the fluid transfer fitment 100 or from a different material or materials. In either case, the meltable seal 70 is formed from a material or materials that may be melted when heated. According to some embodiments of the invention, the meltable seal 70 may be melted by contacting it with a heated member sized to fit within the flanged opening 28. The temperature to which the heated member is heated will vary according to the material or materials from which the meltable seal 70 is formed, as will be apparent to one skilled in the art. Suitable materials include, but are not limited to, low density polyethylenes (LDPEs) and ethylene vinyl acetates (EVAs). Most LDPEs melt between about 105° C. and about 115° C. EVAs typically have a lower melting point around 75° C. But one skilled in the art will recognize that, regardless of the material or materials from which the meltable seal 70 is formed, it may be substantially removed and the fitment prepared for insertion by applying sufficient heat.

FIG. 4 shows the fluid transfer fitment 100 of FIG. 3 following the removal of the meltable seal 70. As can be seen in FIG. 4, some portion of the meltable seal 70 may remain, though this is neither necessary nor essential. What matters is that a sufficient portion of the meltable seal 70 is removed such that the inner surface 24 of the flanged member 28 (FIG. 1) and the void 60 are accessible.

Figure 6:
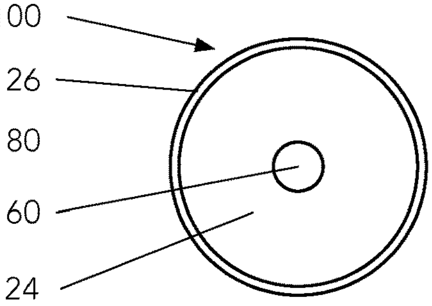
FIG. 6 shows a bottom view of the fluid transfer fitment of FIG. 5 after the seal has been removed.

FIGS. 5 and 6 show bottom views of a fluid transfer fitment 100 according to another embodiment of the invention. In FIG. 5, a film 80 is removably affixed to the edge 26 (FIGS. 1, 6) of the flanged member 28 (FIG. 1). The film 80 preferably includes a tab 82 or similar portion extending radially beyond the edge 26 to facilitate its removal. The film 80 may be affixed to the edge 26 by any method or technique, but will depend, at least in part, on the material or materials from which the film 80 is formed. Suitable materials include, but are not limited to, styrene-butadiene-styrene (SBS), polypropylenes (PPs), thermoplastic elastomers (TPEs), and synthetic rubbers. According to some embodiments, the film 80 comprises a multi-layered film having PP outer layers and an SBS inner layer. According to some embodiments, the film 80 is affixed to the edge 26 using an adhesive. In other embodiments, the film 80 may be heated, thereby allowing it to adhere to the edge 26 without the use of additional adhesives.

In FIG. 6, the film 80 (FIG. 5) has been completely removed, exposing the edge 26, the inner surface 24 of the flanged member 28 (FIG. 1), and the void 60.

Figure 7:
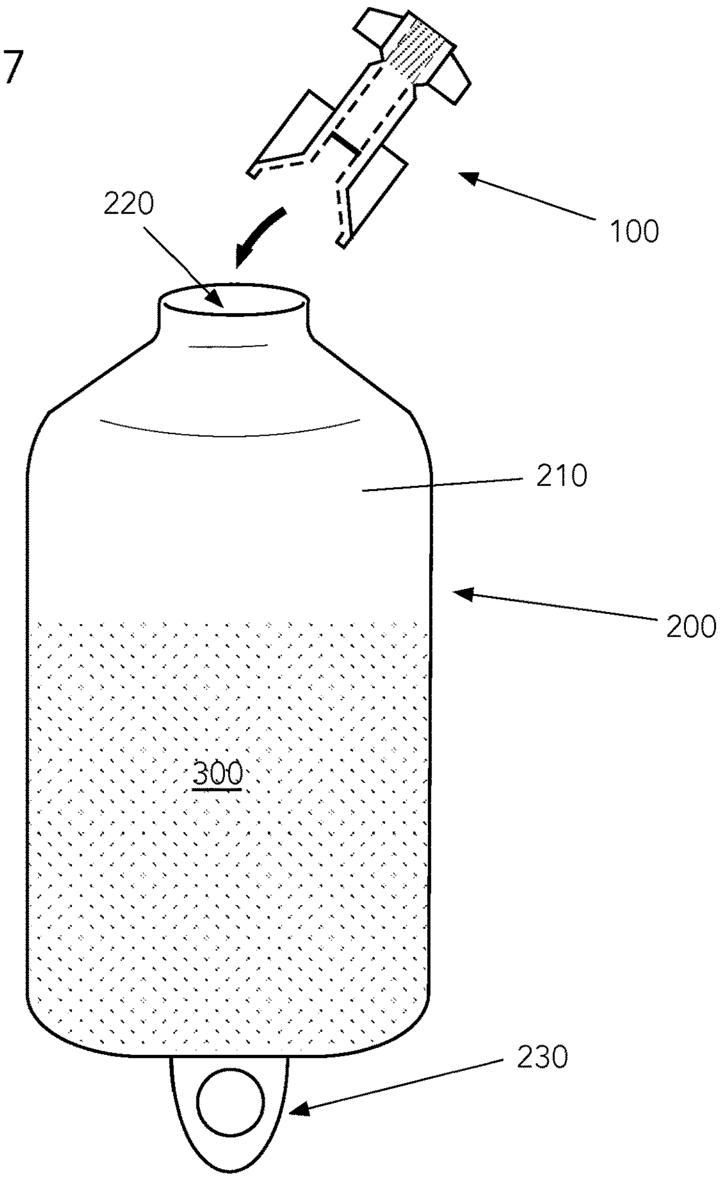
FIG. 7 shows a side view of a filled vessel in which a fluid transfer fitment according to an embodiment of the invention is being inserted.

FIG. 7 shows a side view of the assembly or construction of a fluid dispensing device according to embodiments of the invention. Here, a vessel 200 having a body 210 has been filled with a fluid 300. Vessel 200 may further include an attachment or hanging member 230 for use in suspending the assembled device when in use.

A fluid transfer fitment 100 according to the invention is inserted into an open neck 220 of the vessel 200. As can be seen in FIG. 7, the seal of the fluid transfer fitment 100—whether a meltable seal 70 as in FIG. 3 or a peelable film 80 as in FIG. 5—has been removed. Once inserted, the neck 220 is sealed to the fluid transfer fitment 100. Again, one skilled in the art will appreciate that the precise manner in which such sealing is accomplished will vary depending on the material or materials from which the fluid transfer fitment 100, its components, and the vessel 200 are formed, as well as their individual and collective design and form.

Materials from which the vessel 200 may be formed may be the same as or different than those from which the fluid transfer fitment 100 is formed. For example, in some embodiments of the invention, all or portions of the fluid transfer fitment 100 and/or vessel 200 may be formed from LDPEs and polyolefins. These materials are illustrative and not exhaustive of those which may be employed. Other materials will be apparent to one skilled in the art and are within the scope of the invention.

Figure 8:
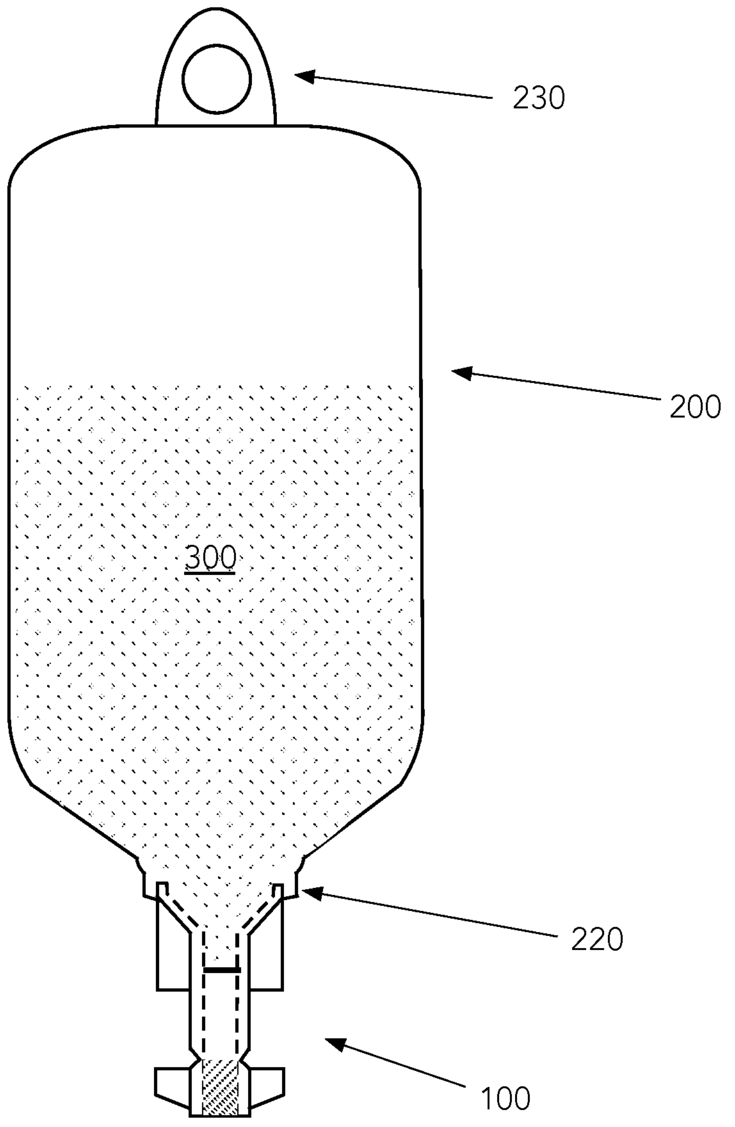
FIG. 8 shows a side view of an assembled fluid dispensing device according to an embodiment of the invention.
Figure 9:
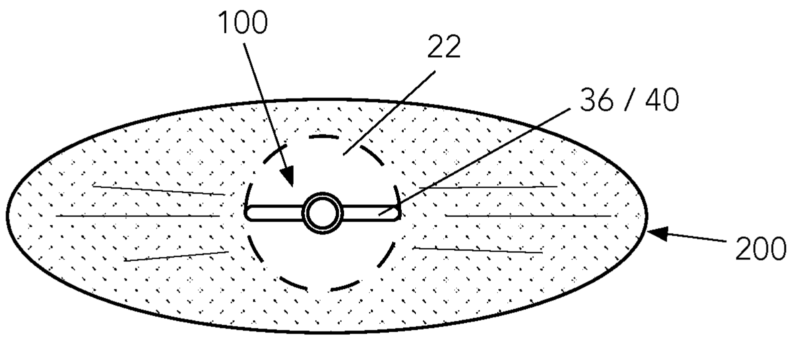
FIG. 9 shows a bottom view of the fluid dispensing device of FIG. 8.

FIG. 8 shows a side view of the assembled fluid dispensing device positioned as it would be in normal use, with the fluid transfer fitment 100 at the lowermost point. As can be seen in FIG. 8, with the seal (70/80; FIGS. 3/5) removed from the flanged member 28 (FIG. 1), fluid 300 flows into void 60 (FIG. 1) up to the lower surface 54 (FIG. 1) of the membrane 50 (FIG. 1). FIG. 9 shows a bottom view of the assembled fluid dispensing device of FIG. 8.

Figure 10:
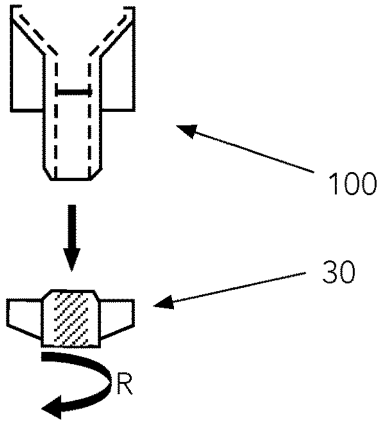
FIG. 10 shows a side view a fluid transfer fitment according to an embodiment of the invention with its cap removed.

FIG. 10 shows a side view of the fluid transfer fitment 100 with its frangible cap 30 removed. By applying a rotational force R to the frangible cap 30, typically to wings 36 (FIG. 1), it may be entirely or partially removed from the first end 12 (FIG. 1) of the tubular body 10 (FIG. 1). As shown in FIG. 10, the frangible cap 30 is entirely removed from the first end 12 (FIG. 1) of the tubular body 10 (FIG. 1), although this is neither necessary nor essential. The frangible cap 30 may be partially removed and remain partially affixed to the first end 12 (FIG. 1), provided access to the upper surface 52 (FIG. 1) of the membrane 50 (FIG. 1) is facilitated, as will be further described below.

Figure 11:
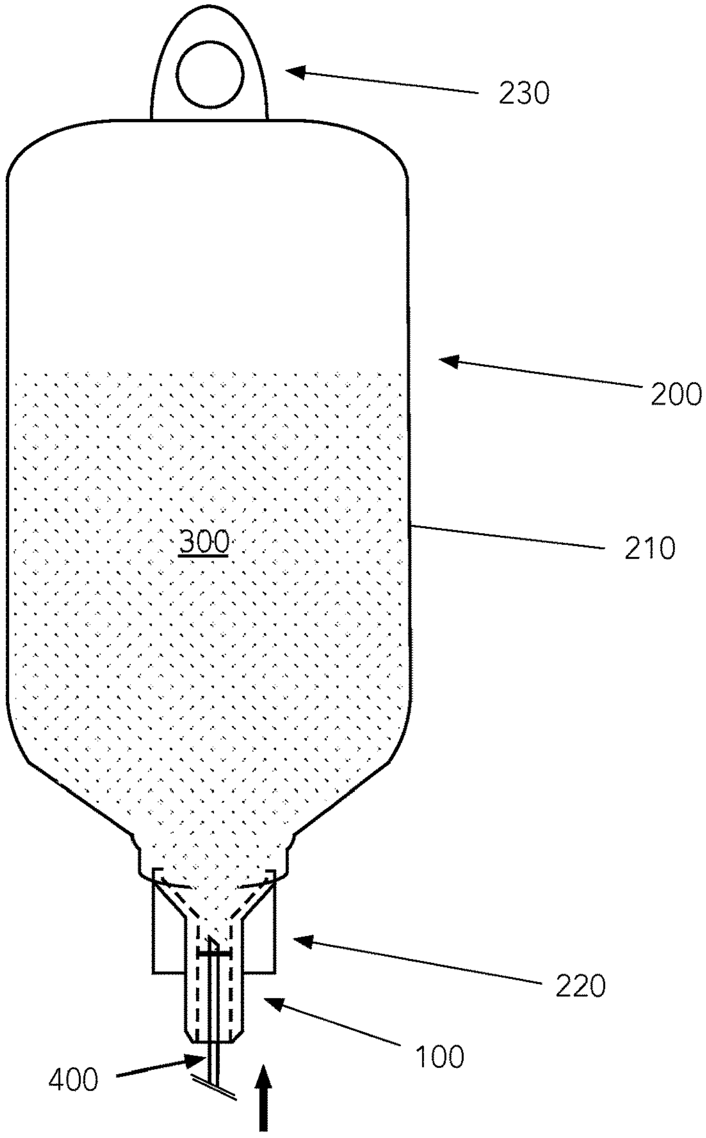
FIG. 11 shows a side view of an assembled fluid dispensing device in use.

FIG. 11 shows an assembled fluid dispensing device according to an embodiment of the invention, positioned for use. Here, an intravenous spike 400 is inserted upward into the fluid transfer fitment 100, piercing the membrane 50, thereby facilitating the dispensing of the fluid 300 from the vessel body 210 through the intravenous spike 400 to its ultimate point of use, which may be, for example, a patient's IV line. One skilled in the art will appreciate that the fluid transfer fitment may accept a variety of fluid access devices, such as IV spikes, needles, or similar devices of various materials, in order to permit the transfer of fluid from the vessel to the point of use.

Figure 12:
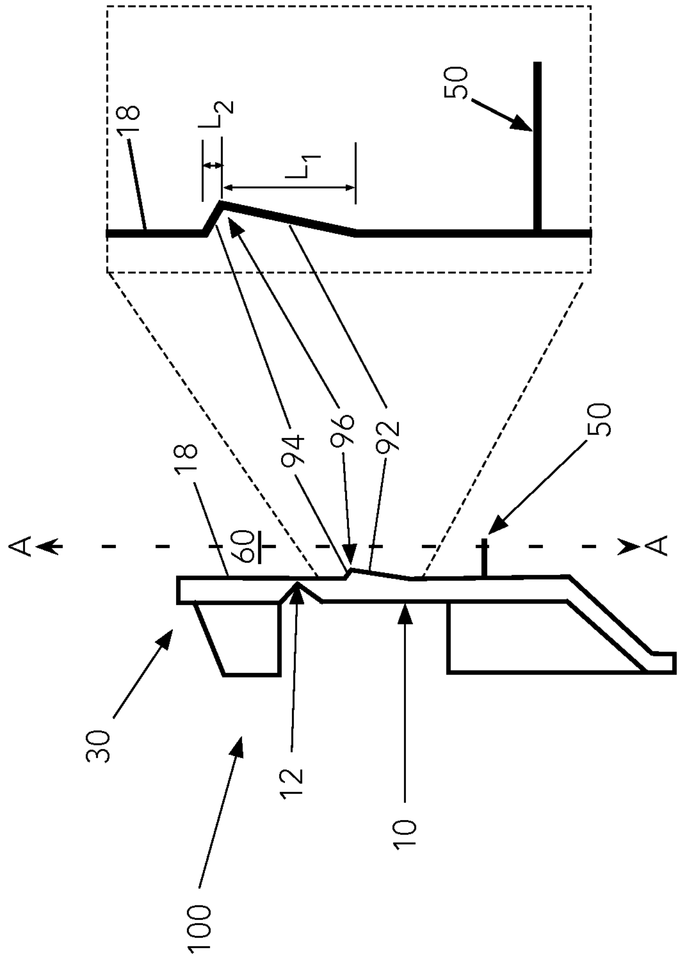
FIG. 12 shows a detailed cross-sectional view of a portion of a fluid transfer fitment according to a preferred embodiment of the invention.

FIG. 12 shows a detailed cross-sectional view of a portion of a fluid transfer fitment 100 according to a preferred embodiment of the invention. Here, a projection 96 extends medially inward from the inner surface 18 of the tubular body 10 toward longitudinal axis A. Projection 96 is formed from two surfaces—a proximal surface 92 nearer the membrane 50 and a distal surface 94 nearer the frangible cap 30.

As can be seen, the proximal surface 92 has a first length $L_1$ greater than the second length $L_2$ of the distal surface 94. As such, the proximal surface 92 extends inward from the inner surface 18 at a shallower angle than does the distal surface 94. This provides two important benefits.

First, during the manufacturing process, a pin (not shown) is extended within the void 60 to form the membrane 50. As the pin is withdrawn from the void 60, projection 96, and particularly the relatively shallow angle of the proximal surface 92 and the relatively steep angle of the distal surface 94 prevents the deposition of particles comprising the material of the membrane 50 in the area of the distal surface 94. The deposition of such particles can impede optimal use of the fluid transfer fitment 100, including the insertion of an intravenous spike intended to pierce the membrane 50, and has been observed in the manufacturing process where the fluid transfer fitment 100 did not include a projection 96 or included a projection having a different arrangement.

Second, during use, the projection 96 provides increased interference between an inserted intravenous spike (not shown) and the inner surface 18 of the tubular body 10. Thus, the projection 96 acts similarly to an o-ring seal commonly employed in other devices, improving the quality of the seal against the inserted intravenous spike and reducing the likelihood of leakage of fluid.

As will be appreciated by one skilled in the art, although the projection 96 is described as included in a preferred embodiment of the invention, it is neither necessary nor essential that the projection 96 be included in every embodiment. The dimensions of the fluid transfer fitment, the material or materials from which it is formed, and the dimensions and design of the intravenous spike intended to be employed may all make incorporation of the projection 96 more or less desirable in any particular case.

As explained above with respect to FIGS. 1, 10, and 11, the frangible cap 30 protects the upper surface 52 of the membrane 50 prior to use but is partially or completely removed from the first end 12 to facilitate insertion of an intravenous spike 400. Applicant has identified additional aspects of the construction of the fluid transfer fitment 100 that optimize both the ability to ensure sterility of the fluid 300 within the vessel body 210 and the ability of a user to easily and consistently dispense the fluid 300 from the vessel body 210.

First, Applicant has found that membrane 50 has an optimal thickness from about 0.2 mm to about 0.3 mm. A membrane thinner than 0.2 mm increases the risk that it will develop weaknesses or perforations extending from its upper surface 52 to its lower surface 54. These would jeopardize the sterility and safety of the fitment 100 and any fluid 300 within the vessel body 210. On the other hand, a membrane thicker than 0.3 mm has been shown to be difficult to puncture with an intravenous spike 400. Accordingly, preferred membranes according to embodiments of the invention are about 0.2 mm to about 0.3 mm thick, more preferably about 0.23 mm to about 0.27 mm, and most preferably about 0.24 mm to about 0.25 mm.

Second, and related to the first finding, is an optimal range of force needed both to pierce the membrane 50 with an intravenous spike 400 and subsequently to remove the intravenous spike 400 from the membrane. A membrane 50 requiring a great deal of force to pierce will make it difficult for some users to use the fluid transfer fitment 100 and any vessel 200 of which it is a part. Contrarily, a membrane 50 requiring too little force to withdraw the intravenous spike 400 may result in the intravenous spike 400 being unintentionally withdrawn.

The precise force needed to pierce the membrane 50 will vary depending on the particular intravenous spike 400 employed, as these vary in their design and dimensions. However, a preferred range of such force is from about 15 N to about 70 N, more preferably from about 30 N to about 50 N. A corresponding range of force needed to withdraw the intravenous spike from the membrane is preferably from about 4 N to about 20 N, more preferably from about 10 N to about 16 N.

Third, Applicant has found that an optimal range of torque exists for the removal of the frangible cap 30. If the frangible cap 30 is too easily removed, it may become partially or completely removed prior to the intended use of the vessel 200 of which the fluid transfer fitment 100 is a part, rendering the vessel 20 and any fluid 300 therewithin unsuitable for use. Contrarily, if the frangible cap 30 is too difficult to remove, a user may not be able to remove it in order to insert the intravenous spike 400. This not only renders the vessel 200 and fluid 300 unsuitable for use, but may prevent the administration of urgently needed treatment. A preferred torque required for removal of the frangible cap 30 is from about 55 Ncm to about 75 Ncm, more preferably from about 60 Ncm to about 70 Ncm, and most preferably about 65 Ncm.

As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid transfer fitment comprising:

a tubular body having a sealed first end and a second end;

a frangible cap at the sealed first end of the tubular body;

a flanged member extending from the second end of the tubular body to form a flanged opening having a width greater than a width of the tubular body;

a removable seal covering the flanged opening;

a void formed between the flanged opening and the sealed first end; and a membrane within the void.

2. The fluid transfer fitment of claim 1, wherein:

the frangible cap includes a plurality of wings extending radially therefrom; and the frangible cap is removable from the first end of the tubular body by exerting upon the plurality of wings a twisting force about a longitudinal axis of the tubular body.

3. The fluid transfer fitment of claim 2, wherein the twisting force is from about 55 Ncm to about 75 Ncm, more preferably from about 60 Ncm to about 70 Ncm, and most preferably about 65 Ncm.

4. The fluid transfer fitment of claim 1, further comprising:

at least one columnar member extending radially outward from an outer surface of the tubular body and axially from an outer surface of the flanged member.

5. The fluid transfer fitment of claim 1, wherein the removable seal comprises a meltable layer or a film affixed to an edge of the flanged opening.

6. The fluid transfer fitment of claim 5, wherein the meltable layer includes at least one material selected from a group consisting of: low density polyethylenes and ethylene vinyl acetates.

7. The fluid transfer fitment of claim 5, wherein the film includes at least one material selected from a group consisting of: styrene-butadiene-styrene (SBS), polypropylenes (PPs), thermoplastic elastomers (TPEs), and synthetic rubbers.

8. The fluid transfer fitment of claim 1, wherein the void includes a projection extending medially inward from an inner surface of the tubular body.

9. The fluid transfer fitment of claim 8, wherein the projection comprises:

a proximal surface having a first length; and a distal surface having a second length less than the first length, wherein the proximal surface is located nearer the membrane than is the distal surface and the distal surface is located nearer the sealed first end than tis he proximal surface.

10. The fluid transfer fitment of claim 1, wherein the membrane has a thickness from about 0.2 mm to about 0.3 mm.

11. The fluid transfer fitment of claim 10, wherein the membrane requires a force from about 15 N to about 70 N, preferably from about 30 N to about 50 N, to be pierced.

12. A method of constructing a fluid dispensing device, the method comprising:

obtaining a fluid transfer fitment according to claim 1;

inserting the flanged opening of the fluid transfer fitment into a neck of a vessel; and sealing the neck of the vessel to at least one outer surface of the fluid transfer fitment.

13. The method of claim 12, further comprising:

removing the removable seal covering the flanged opening.

14. The method of claim 13, wherein the removable seal comprises a meltable thermoplastic layer and removing the removable seal includes melting the meltable thermoplastic layer.

15. The method of claim 13, wherein the removable seal comprises a film affixed to an edge of the flanged opening and removing the removable seal comprises peeling the film from the edge of the flanged opening.

16. A fluid dispensing device constructed according to the method of claim 13.

17. A fluid dispensing device constructed according to the method of claim 12.

18. A fluid transfer fitment comprising:

a tubular body having a sealed first end and a second end;

a flanged member extending from the second end of the tubular body to form a flanged opening having a width greater than a width of the tubular body;

a void formed between the flanged opening and the sealed first end;

a membrane within the void; and a removable seal covering the flanged opening, wherein the removable seal comprises a meltable layer or a film affixed to an edge of the flanged opening.

* * * * *